United States Patent
Muylaert

(10) Patent No.: US 6,309,182 B1
(45) Date of Patent: Oct. 30, 2001

(54) HELICOPTER ROTOR DROOP STOP MECHANISM

(75) Inventor: Neal W. Muylaert, Apache Junction, AZ (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/543,838

(22) Filed: Apr. 5, 2000

(51) Int. Cl.[7] .................................................. B64C 27/38
(52) U.S. Cl. ......................................................... 416/140 R
(58) Field of Search ............................. 416/140 R, 140 A

(56) References Cited

U.S. PATENT DOCUMENTS

| | | | |
|---|---|---|---|
| 2,471,681 | * 5/1949 | Gluhareff | 416/140 X |
| 3,778,189 | 12/1973 | Ferris | 416/140 |
| 3,853,426 | * 12/1974 | Rybicki | 416/140 |
| 3,932,059 | * 1/1976 | Rybicki | 416/140 |
| 4,368,006 | * 1/1983 | Ferris et al. | 416/140 |
| 4,419,051 | 12/1983 | DeRosa | 416/140 |
| 4,652,210 | 3/1987 | Leman et al. | 416/140 |
| 4,808,075 | 2/1989 | Pariani et al. . | |
| 5,007,799 | 4/1991 | Mouille et al. . | |
| 5,951,251 | 9/1999 | Mondet et al. . | |
| 5,951,252 | 9/1999 | Muylaert | 416/140 |

FOREIGN PATENT DOCUMENTS

491164 * 2/1954 (IT) ................................. 416/140 A

* cited by examiner

Primary Examiner—John E. Ryznic
(74) Attorney, Agent, or Firm—Harness Dickey & Pierce P.L.C.

(57) ABSTRACT

A droop stop mechanism is provided for controlling droop of a rotor assembly in both static and dynamic states. The droop stop mechanism includes a U-shaped pendulum having a pair of spaced apart arms interconnected by a stepped base. One end of each of the arms is pivotally coupled to a body of the rotor hub assembly by a pin. A stop plate is coupled between the arms of the pendulum. A spring seat is coupled to the body of the rotor hub assembly opposite the stop plate. A coil spring is coupled between the spring seat and the stop plate. The stepped base includes a first striker portion for abuttingly engaging a tie bar housing of a rotor blade assembly in a static mode position, and a second striker portion for abuttingly engaging the tie bar housing in a dynamic mode position. The bias of the spring urges the pendulum between the static mode position and the dynamic mode position as centrifugal forces acting on the pendulum change. The spring seat doubles as a stop by abuttingly engaging the stop plate when the pendulum is in the dynamic mode position.

21 Claims, 3 Drawing Sheets

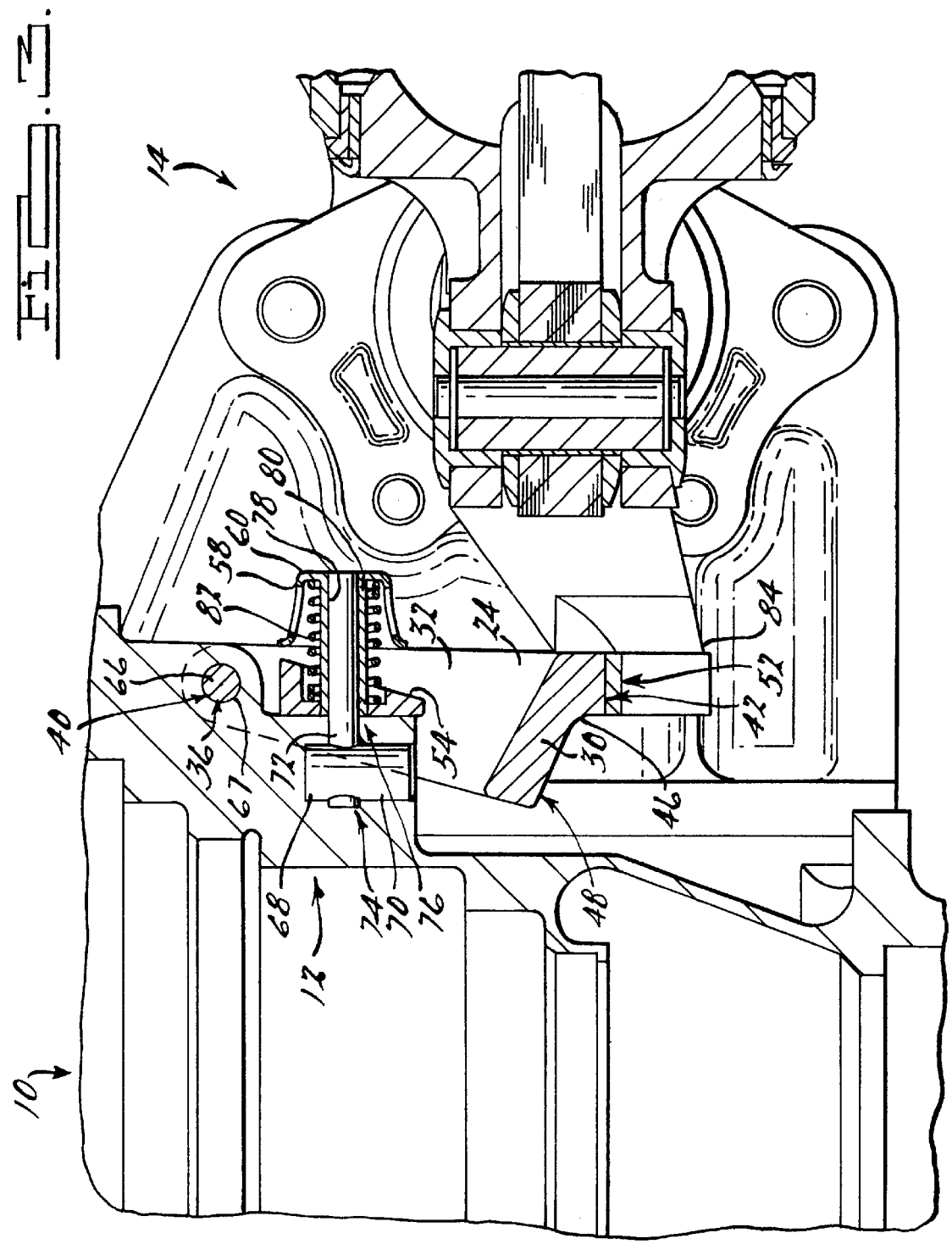

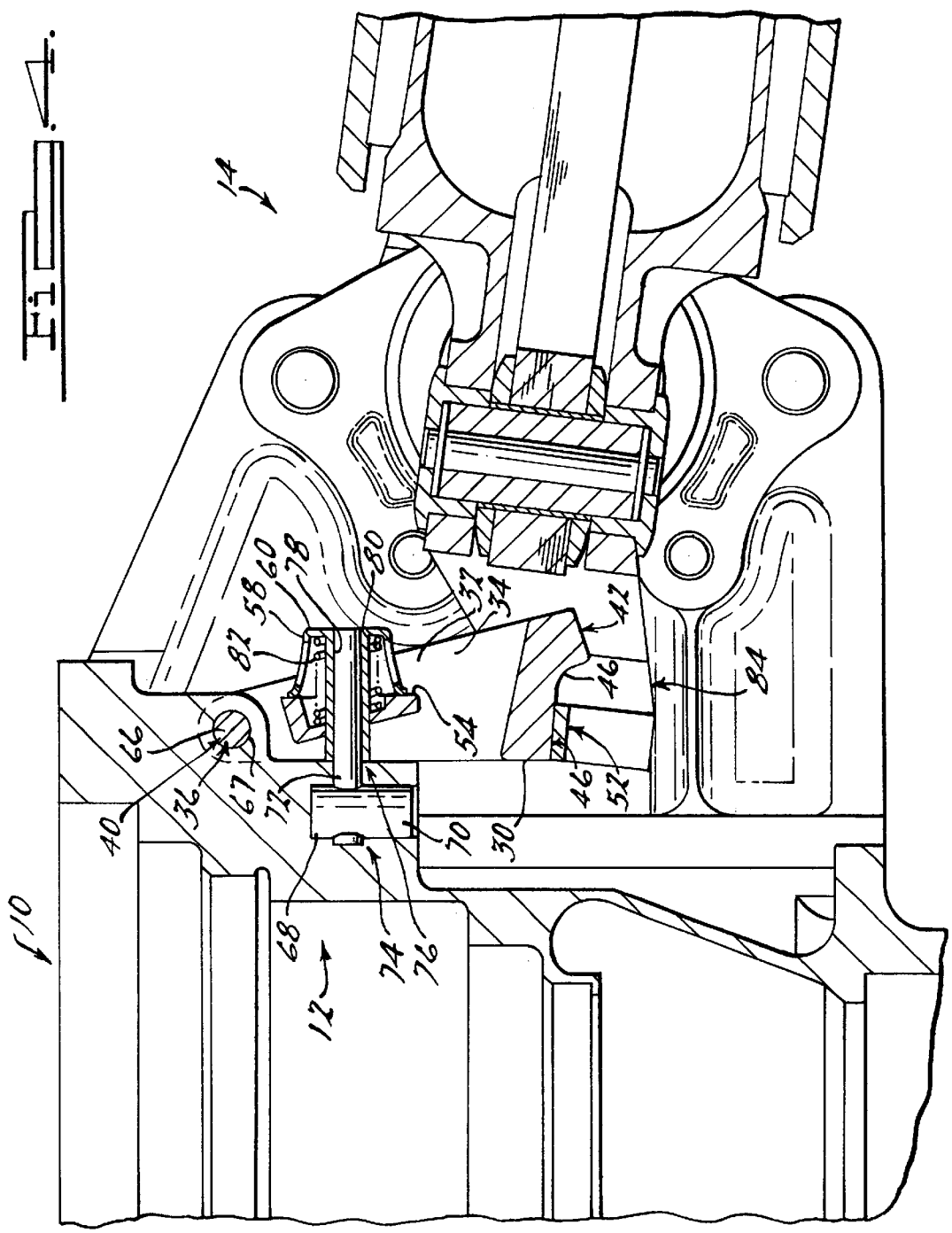

HELICOPTER ROTOR DROOP STOP MECHANISM

TECHNICAL FIELD

This invention relates to helicopter rotor hub assemblies, and more particularly to a droop stop mechanism for such a helicopter rotor hub assembly.

BACKGROUND OF THE INVENTION

Modern rotorcraft, such as helicopters, include a plurality of rotor blades coupled to a central rotor hub assembly. When the rotor hub assembly stops or rotates at low speed, the lift and centrifugal forces on the rotor blades are less than the weight and stiffness of the blades. As such, the blades tend to droop downwardly. When the rotor hub assembly rotates at normal operating speeds, the lift and centrifugal forces overcome the weight and add to the stiffness of the blades thereby eliminating much of the droop.

To control the droop of the rotor blades in both the static and dynamic states just described, most helicopters are equipped with upper and lower stops. Such upper and lower stops are sometimes referred to in the art as droop stop mechanisms. Prior art droop stop mechanisms have a significant drawback due to their complexity. For example, the droop stop mechanism used in the CH-47 rotor includes approximately fourteen components. The droop stop mechanism used in the AH-64 rotor includes approximately nine components. Such complex designs increase production costs due to piece-part pricing, add weight to the overall structure, and are difficult to install and maintain.

In view of the foregoing, it would be desirable to provide a droop stop mechanism for a rotor hub assembly having a minimum number of components while also providing multipositional stops for controlling both static and dynamic droop.

SUMMARY OF THE INVENTION

In preferred embodiments, the present invention is directed towards a droop stop mechanism. In particular, the preferred embodiment of the present invention provides advantages over prior art techniques including simplified construction, lower piece-part pricing, reduced weight, and ease of installation and maintenance. Advantageously, the preferred embodiment of the present invention provides a multipositional stop for controlling droop in both static and dynamic states.

In one preferred embodiment, the droop stop mechanism of the present invention includes a U-shaped pendulum pivotal between a static mode position and a dynamic mode position. The U-shaped pendulum includes a pair of spaced apart, triangularly shaped arms interconnected at their distal ends by a generally rectangularly shaped, stepped base. The proximal end of each of the arms is pivotally coupled to the body of a rotor hub assembly by a pin. The stepped base includes a first striker portion for abuttingly engaging a tie bar housing of a rotor blade assembly in the static mode position. The stepped base also includes a second striker portion which is axially spaced apart from the proximal ends of the arms to a lesser extent than the first striker portion. The second striker portion abuttingly engages the tie bar housing of the rotor blade assembly in the dynamic mode position.

In another preferred embodiment of the present invention, an axially aligned stop plate is coupled between the arms of the U-shaped pendulum adjacent their proximal ends. A cylindrical spring seat is coupled to the rotor hub body opposite the stop plate. A coil spring is coupled between the spring seat and the stop plate. The bias of the spring urges the pendulum between the static mode position and the dynamic mode position as centrifugal forces acting on the pendulum change. The spring seat doubles as a stop by abuttingly engaging the stop plate when the pendulum is in the dynamic mode position.

In yet another preferred embodiment of the present invention, a striker plate is interposed between the stepped base of the pendulum and the tie bar housing of the rotor blade assembly for increasing durability by serving as a wear protector.

BRIEF DESCRIPTION OF THE DRAWINGS

The various advantages of the present invention will become apparent to one skilled in the art by reading the following specification and subjoined claims and by referencing the following drawings in which:

FIG. 3 is a side elevational view in partial cross-section illustrating the droop stop mechanism of the present invention in a static mode; and FIG. 4 is a side elevational view in partial cross-section illustrating the droop stop mechanism of the present invention in a dynamic mode.

DETAILED DESCRIPTION OF THE PREFERRED EMBODIMENTS

The present invention is directed towards a droop stop mechanism for a rotorcraft such as a helicopter. The droop stop mechanism provides a multipositional stop for controlling droop in both static and dynamic states. Advantageously, the droop stop mechanism employs a minimum number of components thereby reducing costs and weight, and facilitating installation and maintenance.

Figure 1:
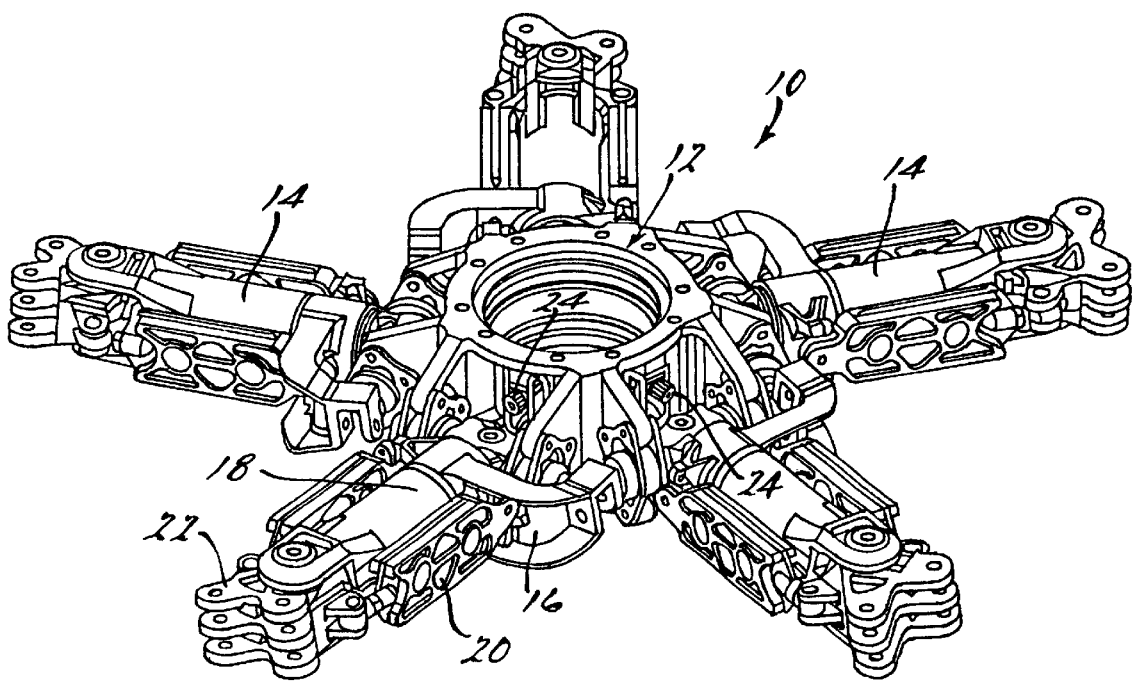
FIG. 1 is a perspective view of a rotor hub assembly for a helicopter or other rotorcraft including a plurality of droop stop mechanisms incorporating the teachings of the present invention.

Referring now to FIG. 1, a rotor hub assembly for a rotorcraft such as a helicopter is illustrated generally at 10. The rotor hub assembly 10 includes a rotor hub body 12 having a plurality of rotor blade assemblies 14 radially projecting therefrom. Each rotor blade assembly 14 includes a flap hinge 16, a pitch hinge 18, and a lead-lag hinge 20 for enabling movement in all planes relative to the rotor hub body 12. Each rotor blade assembly 14 also includes a rotor blade mounting device 22 for securing to a rotor blade. A plurality of droop stop mechanisms 24 are disposed between the rotor blade assemblies 14 and the rotor hub body 12.

Figure 2:
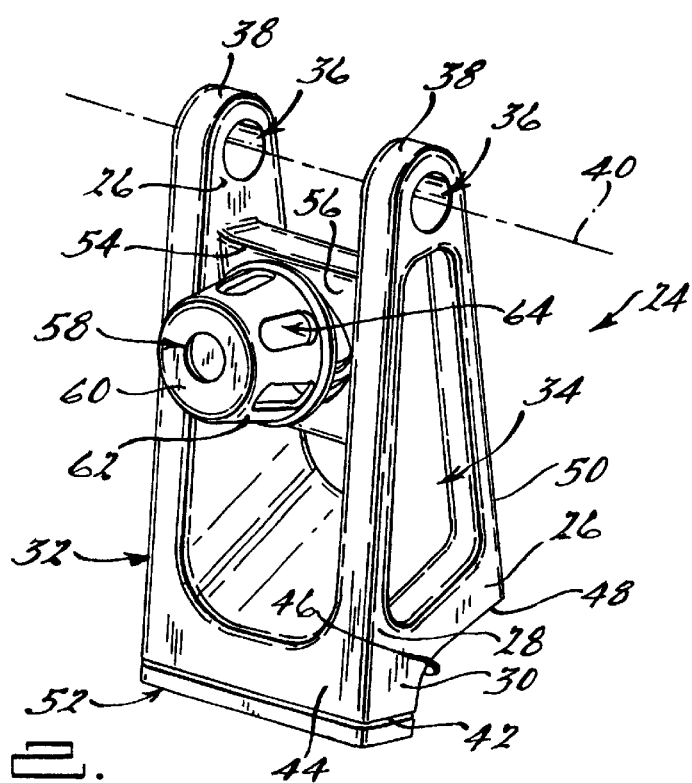
FIG. 2 is a perspective view of a droop stop mechanism of FIG.1.

Turning now to FIG. 2, a droop stop mechanism 24 of FIG. 1 is illustrated in greater detail. The droop stop mechanism 24 includes a pair of laterally spaced apart, generally triangular arms 26 interconnected at their distal ends 28 by a generally rectangularly shaped, stepped base 30. In combination, the arms 26 and base 30 form a pendulum portion of the droop stop mechanism 24 generally indicated at 32.

The pendulum 32 is preferably formed of aluminum, titanium, steel or other metallic material depending on the desired weight and cost of the droop stop mechanism 24. The pendulum 32 may be pressed, stamped, forged or machined to its final shape. Each arm 26 includes a relief portion 34 for tailoring the weight of the droop stop mechanism 24.

Each arm 26 also includes an aperture 36 formed therethrough adjacent a proximal end 38 thereof. The apertures 36 are preferably aligned along a pivot axis 40. Preferably, approximately ninety-five percent of the weight of the pendulum 32 is located below the pivot axis 40.

The base 30 includes a lower stop in the form of a first striker portion 42. The first striker portion 42 is axially spaced apart from the apertures 36 and pivot axis 40 by a preselected distance along the arms 26. Preferably, the first striker portion 42 is essentially orthogonally aligned relative to an outboard surface 44 of the pendulum 32.

The base 30 transitions through an arcuate section 46 to an upper stop in the form of a second striker portion 48. The radius of curvature of the arcuate section 46 is preferably about thirty degrees. The second striker portion 48 is axially spaced apart from the apertures 36 and pivot axis 40 by a lesser amount along the arms 26 than the first striker portion 42. Preferably, the second striker portion 48 is essentially orthogonally aligned relative to an inboard surface 50 of the pendulum 32.

As can be observed in FIG. 2, the inboard surface 50 of the pendulum 32 is shorter than the outboard surface 44. Also, the first striker portion 42 and second striker portion 48 are angled relative to one another. As will be described, this configuration enables the droop stop mechanism 24 to operate in both the static and dynamic states.

A generally rectangularly shaped striker plate 52, to be described in greater detail below, frictionally rides along the base 30 between the first striker portion 42 and the second striker portion 48. The striker plate 52 is designed to wear before the base 30 to extend the life of the droop stop mechanism 24 and simplify maintenance. A relatively soft metallic material such as aluminum is therefore preferred for the striker plate 52.

A stop plate 54 is coupled by welding or the like between the arms 26 of the pendulum 32 so as to be axially aligned therewith. The stop plate 54 is preferably formed of the same material as the remainder of the pendulum 32 but may be formed of a different material if desired for weight or cost concerns. The stop plate 54 preferably includes a generally rectangular stop surface 56 which is angled relative to the outboard surface 44. For this reason, stop plate 54 preferably has a triangular cross-sectional configuration as best seen in FIGS. 3 and 4.

A cylindrical or cup-shaped metallic spring seat 58 is disposed opposite the stop plate 54. The spring seat 58 preferably includes a circular base 60 integrally formed with a conical side wall 62. The side wall 62 preferably includes a plurality of openings 64 formed therein to reduce weight without sacrificing strength or durability.

It should be noted that spring seat 58 is preferably fixed relative to the pendulum 32. As such, when the pendulum 32 is in a static mode position, as illustrated in FIGS. 2 and 3, the stop plate 54 is laterally spaced apart from the spring seat 58 and the stop surface 56 is oriented at an angle relative thereto. However, when the pendulum 32 pivots to a dynamic mode position, as illustrated in FIG. 4, the stop plate 54 abuttingly engages the spring seat 58 and the stop surface 56 is aligned essentially parallel therewith. In this way, the spring seat 58 serves as a stop for the pendulum 32.

Referring now to FIG. 3, the droop stop mechanism 24 of the present invention is shown in a static mode. The pendulum 32 of the droop stop mechanism 24 is pivotally coupled to the rotor hub body 12 by a metallic pin 66 pressed through apertures 67 in the rotor hub body 12 and each aperture 36 in the arms 26 along the pivot axis 40. If desired, a threaded engagement may be provided between the pin 66 and arms 26 adjacent the apertures 36. Also, a nut and bolt configuration may be employed.

The spring seat 58 is coupled to the rotor hub body 12 by a mount 68 so as to be fixed relative to the pendulum 32. The mount 68 includes a metallic axial post 70 secured by pressing, welding or the like to the rotor hub body 12. The mount 68 also includes a metallic lateral post 72 pressed through or otherwise fixedly secured to an aperture 74 in the axial post 70 so as to extend generally orthogonally therefrom.

The lateral post 72 passes through an aperture 76 in the stop plate 54 of the droop stop mechanism 24. The lateral post 72 is fixedly secured by pressing, welding, or the like, within a cylindrical bore 78 of a shaft 80 laterally extending from the base 60 of the spring seat 58. Preferably, the shaft 80 is integrally formed with the base 60 of the spring seat 58.

A biasing device in the form of a coil spring 82 is connected to the spring seat 58 at one end and to the stop plate 54 at an opposite end. The coil spring 82 expands and compresses as the droop stop mechanism 24 pivots between a static mode position (FIG. 3) and a dynamic mode position (FIG. 4). Advantageously, the coil spring 82 may be selected from a wide variety of commercially available springs with a pre-selected spring rate. Presently, a one inch diameter spring with a length of one and a half to one and three-quarter inches is preferred with a spring rate of 13–117 pounds per inch.

The striker plate 52 is coupled to a tie bar housing 84 of the rotor blade assembly 14. The striker plate 52 abuttingly engages the base 30 of the pendulum 32. Preferably, the striker plate 52 is formed of a material such as aluminum which allows it to wear down due to friction before the base 30. In this way, service of the droop stop mechanism 24 due to fatigue only requires replacement of the striker plate 52 rather than the more expensive pendulum 32.

Still referring to FIGS. 3 and 4, the operation of the droop stop mechanism 24 will now be described. In FIG. 3, the pendulum 32 is illustrated in a static mode position. In the static mode, the rotor hub assembly 10 is either stopped or is slowly rotating. As such, the tie bar housing 84 of the rotor blade assembly 14, and more particularly the striker plate 52, frictionally engages the first striker portion 42 of the pendulum 32. Due to the length and rigidity of the pendulum 32 between the pin 66 and the first striker portion 42, the rotor blade assembly 14 is limited to a preselected angle relative to the rotor hub assembly 10. Further, in the static mode the spring seat 58 is laterally spaced apart from the stop plate 54 and the spring 82 is in an extended position.

As the rotor hub assembly 10 rotates at higher speeds, centrifugal forces urge the pendulum 32 radially outwardly relative to the rotor hub assembly 10. Eventually, the centrifugal forces are great enough to cause the pendulum 32 to pivot away from the rotor hub assembly 10. This causes the first striker portion 42 of the pendulum 32 to slide across the tie bar housing 84, and more particularly the striker plate 52. Eventually, the arcuate section 46 slides over the striker plate 52 which finally resides along the second striker portion 48. The initial movement of the pendulum 32 relative to the striker plate 52 is aided by the compressive force of the spring 82 pulling on the pendulum 32.

In FIG. 4, the pendulum 32 is illustrated in a dynamic mode position. In the dynamic mode, the rotor hub assembly 10 is rotating at or near operating speeds. As such, the tie bar housing 84 of the rotor blade assembly 14, and more particularly the striker plate 52, frictionally engages the second striker portion 48. Due to the length and rigidity of the pendulum 32 between the pin 66 and the second striker portion 48, the rotor blade assembly 14 is limited to a preselected angle relative to the rotor hub assembly 10. Further, in the dynamic mode the spring seat 58 abuttingly engages the stop plate 54 and the spring 82 is in a compressed position. The abutment of the spring seat 58 with the stop plate 54 controls the outboard pivoting of the pendulum 32 relative to the rotor hub assembly 10.

As the rotor hub assembly 10 begins to slow, centrifugal forces ease so that the pendulum 32 tends to pivot radially inwardly relative to the rotor hub assembly 10. Eventually, the centrifugal forces are low enough to cause the second striker portion 48 of the pendulum 32 to slide across the tie bar housing 84, and more particularly the striker plate 52. Eventually, the arcuate section 46 slides over the striker plate 52 which finally resides along the first striker portion 42. The initial movement of the pendulum 32 relative to the striker plate 52, including the movement of the arcuate section 46 across the striker plate 52, is aided by the expansive force of the spring 82 pushing on the pendulum 32.

In view of the foregoing, it can be appreciated that the present invention provides a droop stop mechanism for rotorcraft such as helicopters. Advantageously, the droop stop mechanism of the present invention provides a multi-positional stop for controlling droop in both static and dynamic states. Also, the droop stop mechanism of the present invention employs a minimum number of components thereby minimizing costs and weight, and easing installation and maintenance.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A droop stop device comprising:
   a pendulum pivotally coupled at a proximal end for movement between a first position and a second position;
   a member abuttingly engaging a first portion of a distal end of said pendulum in said first position and a second portion of said distal end in said second position;
   a stop plate coupled to said pendulum;
   a spring seat disposed opposite said stop plate; and
   a biasing device coupled between said spring seat and said stop plate.

2. The device of claim 1 wherein said pendulum further comprises:
   a pair of laterally spaced apart arms interconnected by a base member.

3. The device of claim 2 wherein said arms are generally triangularly shaped.

4. The device of claim 2 wherein each of said arms includes an aperture formed therethrough adjacent said proximal end.

5. The device of claim 4 wherein said apertures define a pivot axis for said pendulum and approximately ninety-five percent of a weight of said pendulum is located on one side of said pivot axis.

6. The device of claim 2 wherein said base further comprises:
   a first striker portion axially spaced apart from said proximal end of said pendulum by a first preselected distance; and
   a second striker portion axially spaced apart from said proximal end by a second preselected distance, said second preselected distance being less than said first preselected distance.

7. The device of claim 6 wherein said first striker portion is essentially orthogonally aligned relative to an outboard surface of said pendulum.

8. The device of claim 7 wherein said second striker portion is essentially orthogonally aligned relative to an inboard surface of the pendulum.

9. The device of claim 6 wherein said first striker portion is angled relative to said second striker portion.

10. The device of claim 6 wherein said base includes an arcuate section between first and second striker portions.

11. The device of claim 10 wherein said arcuate section has a radius of curvature of about thirty degrees.

12. The device of claim 1 further comprising a striker plate interposed between said member and said base.

13. The device of claim 1 wherein said stop plate includes a surface angled relative to said spring seat in said first position and essentially parallel to said spring seat in said second position.

14. The device of claim 1 wherein said spring seat is cylindrically shaped.

15. The device of claim 1 wherein said pendulum is pivotally coupled to a body of a rotor hub assembly.

16. The device of claim 1 further comprising a mount interconnecting said spring seat with a body of a rotor hub assembly.

17. The device of claim 16 wherein said mount includes an axial post secured to said body and a lateral post secured to said axial post.

18. The device of claim 17 wherein said lateral post passes through an aperture formed in said stop plate.

19. The device of claim 18 wherein said lateral post is secured within a cylindrical bore of a shaft laterally extending from said spring seat.

20. The device of claim 1 wherein said biasing device further comprises a coil spring.

21. The device of claim 1 wherein said member further comprises a tie bar housing of a rotor blade assembly.

* * * * *